United States Patent [19]

Worm

[11] 4,287,322

[45] Sep. 1, 1981

[54] EPICHLOROHYDRIN ELASTOMER COMPOSITIONS

[75] Inventor: Allan T. Worm, North St. Paul, Minn.

[73] Assignee: Minnesota Mining and Manufacturing Company, St. Paul, Minn.

[21] Appl. No.: 87,503

[22] Filed: Oct. 23, 1979

[51] Int. Cl.³ ............................................. C08G 65/32
[52] U.S. Cl. .................................................. 525/403
[58] Field of Search ......................................... 525/403

[56] References Cited

U.S. PATENT DOCUMENTS

| | | | |
|---|---|---|---|
| 2,807,648 | 9/1957 | Pitt | 260/607 |
| 3,158,580 | 11/1964 | Vandenberg | 260/2 |
| 3,158,581 | 11/1964 | Vandenberg | 260/2 |
| 3,448,063 | 6/1969 | Breslow | 260/2 |
| 3,726,841 | 4/1973 | Mirolli et al. | 260/79 |
| 4,051,078 | 9/1977 | Kato et al. | 260/2 A |

FOREIGN PATENT DOCUMENTS 2011924 7/1979 United Kingdom .

OTHER PUBLICATIONS

Encyclopedia of Polymer Science and Technology, vol. 6, (Interscience, N. Y., 1967), pp. 198-200.
Hercules, Inc., Technical Bulletin ORH-1D.
B. F. Goodrich Chemical Co. Product Information Bulletin 6702-SPM.
"Concerning Amines", David Ginsburg, Pergamon Press, N. Y., 1967, p. 73.
Wiegand et al., "Triarylsulfonium Halides", J. Org. Chem. 33, 2671-2675, (1968).
Ohkubo et al., "Ulraviolet Spectroscopy Study on Sulfonium Salts", J. Org. Chem. 36, 3149-3155, (1971).
Marino, *Topics in Sulfur Chemistry*, Georg Thieme, Stuttgart, 1976, p. 32.

*Primary Examiner*—Earl A. Nielsen
*Attorney, Agent, or Firm*—Cruzan Alexander; Donald M. Sell; William G. Ewert

[57] ABSTRACT

A gum stock composition comprising polyepichlorohydrin gum, polyphenol, organo-onium compound, and acid acceptor is shaped and cured to form shaped elastomeric articles.

26 Claims, No Drawings

EPICHLOROHYDRIN ELASTOMER COMPOSITIONS

This invention relates to polyepichlorohydrin gum stock, curable compositions thereof, to a method for curing said curable gum stock, and to shaped articles of the cured elastomer products thereof.

Linear homopolymers of epichlorohydrin and linear copolymers of epichlorohydrin with other cyclic ethers are commonly referred to as polyepichlorohydrin gums. These linear polymers are typically thermally cured (i.e. cross-linked or vulcanized, thereby undergoing conversion from a thermoplastic substance to a thermoset substance) into useful elastomeric products using imidazolines (e.g. 2-mercaptoimidazoline), diamines (e.g. hexamethylene diamine), internal salts of diamines (e.g. hexamethylene diamine carbamate), and thioureas (e.g. trimethylthiourea) as curing agents, in conjunction with acid acceptors such as red lead ($Pb_3O_4$) and dibasic lead phosphite ($PbHPO_3$). These conventionally compounded polymers or curable gum stocks tend to undergo premature, partial cure ("scorch") during compounding, milling or storage. If significant scorch occurs, the gum stock can no longer be readily molded. In addition, conventionally cured epichlorohydrin elastomers have limited life at moderately elevated temperatures (for example, about 1 to 3 weeks at 150° C. for epichlorohydrin homopolymer), losing strength and resilience. Failure of the cured elastomer may be due to excessive cross-linking (whereby the rubber part becomes rigid or brittle) or reversion (whereby the rubber part becomes soft and weak). Sometimes failure of these cured elastomers is rapid and catastrophic, resulting in machine breakdown, inconvenience, expense and lost time. Also, most conventionally cured epichlorohydrin elastomers undergo significant compression set in use, i.e., they lose their resilience after being subjected to long-term compressive stress, failing to return to their original dimensions when released. Compression set is aggravated at elevated temperatures. Rubber gaskets and O-rings are especially vulnerable to compression set—the increase in compression set and attendant loss of resiliency may result in fluid leakage, contamination, etc.

Epichlorohydrin homopolymer (designated "CO" by ASTM D-1418-76) and epichlorohydrin-ethylene oxide copolymer (designated "ECO" by ASTM D-1418-76) are currently the most widely used epichlorohydrin polymer gums, finding extensive applications, for example, in the manufacture of automotive hoses and seals. The most generally useful cure system for epichlorohydrin polymer gums employs 2-mercaptoimidazoline and red lead (see Encyclopedia of Polymer Science and Technology, Vol. 6 (Interscience, New York, 1967) pp. 198-200). U.S. Pat. No. 3,726,841 discloses a process for accelerating the cross-linking of epihalohydrin polymers with halide salts of aliphatic quaternary ammonium and tetraalkyl phosphonium compounds. The cross-linking agents employed are various polyamines and certain heterocyclic compounds combined with certain metal compounds. U.S. Pat. No. 4,051,078 discloses a cure system for epichlorohydrin comprising a metal oxide with a valence state of two to five and certain polyhydroxy compounds with four or more —OH groups. U.K. published Patent Application Ser. No. 2,011,924 A discloses a cure system for blends of fluoroelastomer and epichlorohydrin comprising an acid acceptor, a curing accelerator, and a fluorine-containing polyhydroxy compound. The curing accelerators described in that application are certain tertiary amines, salts of those amines, and certain tertiary phosphines.

It is an object of the present invention to provide epichlorohydrin polymer gum stock and curable compositions thereof with low tendency to scorch, good shelf life, and rapid cure rates. Another object of this invention is to provide masterbatch compositions useful in making said curable gum stock compositions. Another object is to provide elastomer shaped articles from said curable gum stock compositions. Another object of this invention is to provide cured epichlorohydrin elastomer compositions which have low compression set and useful thermal aging properties.

The present invention provides an epichlorohydrin polymer gum stock composition comprising:
(A) polyepichlorohydrin gum, consisting of a homopolymer of epichlorohydrin or a copolymer of epichlorohydrin with one or more other cyclic ethers;
(B) polyphenol compound as a curing agent; and
(C) certain organoammonium, organoarsonium, organophosphonium, or organosulfonium compounds as cocuring agents;

which composition in reactive association with an acid acceptor will, upon exposure to heat, cure into an elastomer. Said curable gum stock compositions (which can be made from masterbatch compositions) can be extruded or molded into desired shapes, such as O-rings, gaskets, and hoses, which are heated to produce elastomeric shaped articles.

In the practice of this invention, the polyepichlorohydrin gum (A) is a solid, predominantly amorphous, high molecular weight (i.e. greater than about 40,000 number average molecular weight) epichlorohydrin homopolymer gum, copolymer gums of epichlorohydrin with other cyclic ethers (for example, ethylene oxide, propylene oxide, 2-butene oxide, ethyl glycidyl ether, and trimethylene oxide), or blends of the above polymer gums. Generally useful copolymer gums will contain about 50 mol % of epichlorohydrin gum. Representative polyepichlorohydrins useful in this invention are described in U.S. Pat. Nos. 3,158,580, 3,158,581, and 3,726,841. Readily available commercial polymer gums include "Herclor H" epichlorohydrin homopolymer (see Hercules Inc. Technical Bulletin ORH-1D), "Hydrin 100" epichlorohydrin homopolymer (see B. F. Goodrich Chemical Co. Product Information Bulletin 6702-SPM), "Herclor C" epichlorohydrin-ethylene oxide copolymer (see Hercules Inc. Technical Bulletin ORH-1D) and "Hydrin 200" epichlorohydrinethylene oxide copolymer (see B. F. Goodrich Chemical Co. Product Information Bulletin 6702-SPM).

The polyphenol curing agent (B) can be any aromatic compound with two or more hydroxyl groups directly bonded to aromatic ring carbon atoms. Preferred compounds include polyhydroxy benzenes, naphthalenes, anthracenes, chromones, xanthones, anthraquinones, and polyphenols of the formula:

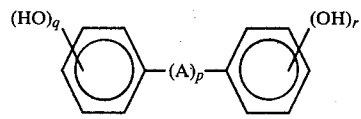

wherein p is 0 or 1; the sum (q+r) is 2 to 4 or more; and A is a thio, oxy, sulfinyl, sulfonyl or carbonyl radical, or a divalent organic radical containing 1 to 13 carbon atoms.

The polyphenol compound (B) can optionally be substituted with moieties which do not interfere with the functioning of the compound as a curing agent in the practice of this invention. Unsubstituted polyphenol curing agents are preferred. Salts of the above polyphenols or other derivatives which decompose or rearrange into the above polyphenols can be used. Mixtures of more than one of the above polyphenols may be used in this invention.

Representative polyphenols useful in this invention include hydroquinone, 2-methyl hydroquinone, 2,5-dimethyl hydroquinone, 2-t-butyl hydroquinone, resorcinol, 2-methyl resorcinol, 5-methyl resorcinol, 2,4-dibenzoylresorcinol, catechol, 2,4-dihydroxyacetophenone, 1,5-dihydroxynaphthalene, 9,10-dihydroxyanthracene, 1,4,9,10-tetrahydroxyanthracene, 3,6-dihydroxyxanthone, 2,6-dihydroxyanthraquinone, 4,4'-dihydroxydiphenylsulfoxide, 4,4'-dihydroxydiphenylsulfone (Bisphenol S), 1,1-cyclohexylidene-bis (4-hydroxybenzene), 2-chloro-1,4-cyclohexylene-bis (4-hydroxybenzene), 2,2-isopropylidene-bis (4-hydroxybenzene) (Bisphenol A), hexafluoroisopropylidene-bis(4-hydroxybenzene) (Bisphenol AF), 2,4'-dihydroxybenzophenone, 4,4'-dihydroxybenzophenone, 2,2',4,4'-tetrahydroxybenzophenone, and 2-fluoro-1,4-phenylene-bis(4-hydroxybenzene). Bisphenol S is a preferred polyphenol but others may be chosen by those skilled in the art in order to provide selected curing characteristics for particular applications.

The organo-onium cocuring agent (C) is an organoammonium, organoarsonium or organophosphonium compound of the formula

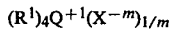

or

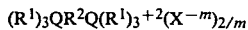

wherein Q is a nitrogen, arsenic, or phosphorus atom; X is an anion of valence m; each $R^1$ is a monovalent organic radical which is the same as or different from any other $R^1$, can combine with another $R^1$ to form a cyclic structure containing a Q atom, can contain from 1 to about 20 carbon atoms, can have a carbon skeletal chain which is linear, branched or cyclic and is saturated, unsaturated or aromatic, which chain can contain hetero skeletal atoms other than carbon (e.g. oxygen or sulfur) and can be unsubstituted or substituted with moieties which do not interfere with the functioning of the compound as a cocuring agent; and $R^2$ is a divalent organic radical containing from 2 to 12 (preferably 2 to 8) carbon atoms.

The organo-onium cocuring agent (C) can also be an organosulfonium compound of the formula

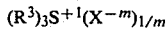

or

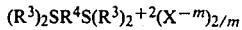

wherein S is sulfur; X is an anion of valence m; each $R^3$ is a monovalent organic radical which is the same as or different from any other $R^3$, can combine with another $R^3$ to form a cyclic structure containing an S atom, can contain from 1 to about 20 carbon atoms, can have a carbon skeletal chain which is linear, branched, or cyclic, which chain can be saturated, unsaturated or aromatic, can contain hetero skeletal atoms other than carbon (e.g. oxygen or sulfur) and can be unsubstituted or substituted with moieties which do not interfere with the functioning of the compound as a cocuring agent; $R^4$ is a divalent organic radical having from 2 to 12 (preferably 2 to 8) carbon atoms; and at least one $R^3$ or $R^4$ group is aromatic.

Mixtures of more than one of the above organo-onium cocuring agents can be used in this invention.

In the above organo-onium cocuring agent formulas, suitable anions X include chloride, bromide, sulfate, bisulfate, nitrate, hydroxide, carbonate, perchlorate, trifluoromethane sulfonate, acetate, benzene sulfonate, phenate, tetrafluoroborate, hexachlorophosphate, hexafluorophosphate, hexachlorostannate, hexafluoroarsenate, and hexafluoroantimonate.

In the above formulas, preferably $R^1$ and $R^3$ are alkyl, alkenyl, cycloalkyl, phenyl, or combinations thereof, and $R^2$ and $R^4$ are alkylene, phenylene or combinations thereof such as phenylenedialkylene with at least one of $R^3$ and $R^4$ containing an aromatic nucleus with 6 ring-carbon atoms. The $R^1$, $R^2$, $R^3$, or $R^4$ groups can contain substituents which do not interfere with the function of the compound as a cocuring agent, such as halo, alkoxy, alkylthio, phenylthio, carboalkoxy, acetoxy, and acetamido. Most preferably $R^1$, $R^2$, $R^3$ and $R^4$ are unsubstituted. In general, organophosphonium compounds are preferred as cocuring agents due to their ready availability.

Representative organo-onium cocuring agent compounds include:

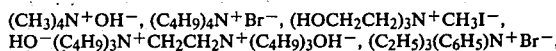
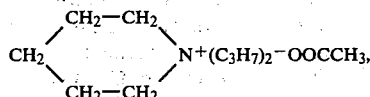
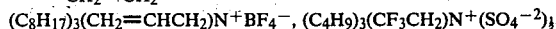
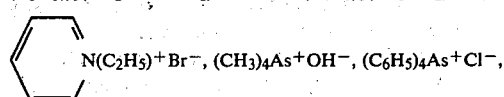
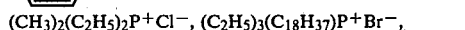
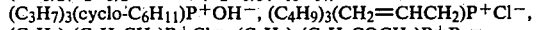
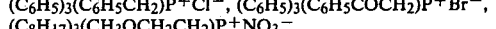
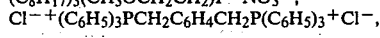
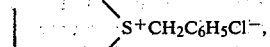
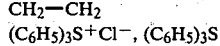

diphenylnaphthylsulfonium trifluoromethanesulfonate, tritolylsulfonium, anisyldiphenylsulfonium hexafluoroantimonate, 4-butoxyphenyldiphenylsulfonium tetrafluoroborate, 4-chlorophenyldiphenylsulfonium acetate, tris(4-phenoxyphenyl)sulfonium hydroxide, di(4-ethoxyphenyl)methylsulfonium hexafluoroarsenate, 4-acetoxy-phenyldiphenylsulfonium carbonate, tris(4-thiomethoxyphenyl)sulfonium hexafluorophosphate, di(methoxysulfonylphenyl)methylsulfonium chloride, di(methoxynaphthyl)methylsulfonium tetrafluoroborate, tris(carbomethoxyphenyl)sulfonium hexafluorophosphate, and 4-acetamidophenyldiphenylsulfonium perchlorate.

Synthetic routes to the above organo-onium compounds are well known and are described, for example, in "Concerning Amines", David Ginsburg, (Pergamon Press, New York, 1967) page 73; "Psuedohalo Metal Compounds XVIII", Beck et al, Chem Ber, 100, 2335–61 (1967) (arsenic), "Organic Phosphorus Compounds", G. M. Kosolapoff and L. Maier, (Wiley-Interscience, New York, 1972) Vol. 2, page 189; J. Org. Chem., G. H. Wiegand, et al, 33, 2671–75(1968) (sulfur); J. Org. Chem., K. Ohkubo, et al, 36, 3149–55(1971) (sulfur); "Topics in Sulfur Chemistry", J. P. Marino, (Georg Thieme, Stuttgart, 1976) page 32; and U.S. Pat. No. 2,807,648, the teachings of which are incorporated herein by reference.

Prior to curing, an acid acceptor (preferably an inorganic base) is added to the polyepichlorohydrin gum stock to provide a curable gum stock or compound. Suitable acid acceptors include magnesium oxide, lead oxide, calcium oxide, calcium hydroxide and dibasic lead phosphite. Mixtures of more than one acid acceptor may be used in this invention. Preferred acid acceptors are dibasic lead phosphite and white lead (PbO).

Other gum stock ingredients commonly used as compounding adjuvants for polyepichlorohydrin gums can also be included in the curable polymer gum stock, such as heat stabilizers (additives which improve retention of physical properties at elevated temperatures such as phenyl-betanaphthylamine, N,N'-di-beta-naphthyl-p-phenylenediamine, N-isooctyl-p-aminophenol, polymerized 2,2,4-trimethyl-1,2-dihydroquinoline, nickel dibutyldithiocarbamate and nickel dimethyldithiocarbamate), processing aids, lubricants, plasticizers, and fillers (e.g. high surface carbon blacks and amorphous silicas).

The amounts of each component (A), (B), and (C), and any compounding adjuvants used will depend upon the proposed application and desired cure characteristics. In general, a lower concentration of polyphenol curing agent in the curable gum stock will produce a lower crosslink density and lower modulus in the cured product while a higher concentration of polyphenol curing agent will produce higher crosslink density and higher modulus. Low concentrations of organo-onium cocuring agent or acid acceptor will produce slower cures. Suitable concentration ranges for producing a useful cured product are shown below. The term "parts" refers to parts by weight of polyepichlorohydrin gum. The term "phr" refers to parts per hundred parts of polyepichlorohydrin gum. The term "mmhr" refers to millimoles per hundred grams of polyepichlorohydrin gum:

| Gum Stock Component | Amount |
| --- | --- |
| polyepichlorohydrin | 100 parts |
| polyphenol curing agent | 0.3 to 15 mmhr |
| organo-onium cocuring agent | 0.2 to 7.5 mmhr |
| acid acceptor | 0.5 to 40 phr |

Compounding adjuvants may be added in conventional quantities, e.g. heat stabilizers at 0.1 to 20 phr, and preferably at 0.5 to 10 phr.

The addition of conventional amine curing agents (e.g. hexamethylene diamine) ordinarily should be avoided. The presence of such amines tends to slow down the cure rate and degrade the storage life, heat aging and compression set of the compositions of the present invention.

Mixing of the above components and additives can be carried out in any order. It may be convenient to mill the polyphenol curing agent and the organo-onium cocuring agent into the polyepichlorohydrin gum, forming a gum stock. This gum stock will have an extended storage life at room temperature, e.g. one year or more. Prior to curing, the acid acceptor(s) are milled into the gum stock, after which the room temperature shelf life is more limited, e.g. to a few months. Additives can be milled into the gum stock at any time prior to curing.

Variations on the above mixing scheme can be used, e.g. the polyphenol curing agent, organo-onium cocuring agent, and the acid acceptor can be admixed and later combined with the polymer gum. Masterbatch techniques can be used in preparing the curable gum stock. For example, a masterbatch can be prepared by combining 100 parts (by weight) of polymer gum with from about 100 to 900 parts of curing agent and from about 100 to 900 parts of cocuring agent. Alternatively, the polyphenol curing agent can be mixed into a carrier (at a concentration of about 100 to 900 parts of curing agent in 100 parts of carrier) to provide a first masterbatch and the organo-onium cocuring agent can be separately mixed into a carrier (at a concentration of about 100 to 900 parts of cocuring agent in 100 parts carrier) to form a second masterbatch, and the first and second masterbatches later milled into the polyepichlorohydrin gum to form the gum stock, to which the acid acceptor is subsequently added to form a curable gum stock. This latter masterbatch technique allows convenient adjustment by the user of the amounts of each component in the gum stock and helps ensure thorough dispersion of these components in the gum stock. In addition, mixing either the polyphenol curing agent or the organo-onium cocuring agent with a carrier reduces the likelihood that hazardous or environmentally deleterious substances will be released into the atmosphere during mixing, since some of these components are in the form of a dusty powdered solid. Suitable carriers include polyepichlorohydrin gum, neoprene, chlorosulfonated polyethylene, chlorinated polyethylene, and ethylene-propylene copolymer. Polyepichlorohydrin gum is the preferred carrier.

Mixing of the gum stock components can be carried out using any of the usual rubber mixing devices, such as Banbury mixers, roll mills, or any other convenient mixing device. It has been found that a two-roll rubber mill equipped with heat exchange means, e.g., cored chambers for cooling, is particularly suitable since the heat generated by the high shearing forces in mixing can be dissipated and the temperature more accurately regulated with this device than with devices providing other means for temperature control. The temperature of the mixture on the mill generally should not be allowed to rise above about 120° C. The mixture should be milled sufficiently to distribute the cross-linking agents and other ingredients throughout the gum stock. About 5 to 20 minutes or longer is recommended for this process.

The curable gum stock is shaped by molding or extruding and thermally cured into a useful elastomeric product. By "elastomeric" is meant the ability of the cured vulcanizate, when slowly stretched at room temperature to at least twice its original length and released, to return rapidly to essentially its original length.

Forming a shaped article by molding typically comprises pressing the curable gum stock in a hot mold, releasing the shaped part from the mold, and (to develop optimum properties) subsequently post curing the part in an oven. The mold can first be coated with a release agent, such as a silicone oil. Molding can be carried out at a temperature between about 95° C. and about 230° C., preferably between about 150° C. and about 205° C., for a period of from about 1 minute to 15 hours, usually from 5 minutes to 30 minutes, and at a pressure of between about 0.7 MPa and about 20.6 MPa, preferably between about 3.4 MPa and about 6.8 MPa. The vulcanized molded article can be post cured at a temperature between about 120° C. and about 205° C., usually at about 150° C. to 180° C., for a period of from about 4 hours to 24 hours or more depending on the cross-sectional thickness of the sample. For thick sections, the temperature during the post cure usually is raised gradually from the lower limit of the range to the desired maximum temperature selected. For thinner sections, e.g., less than 5 mm, the section can be put into the oven at the desired maximum temperature.

Alternatively, the curable gum stock can be shaped by extrusion rather than molding. Extrusion typically comprises heating the curable gum stock to a temperature of about 100° C. and forcing it through a suitable die or orifice at a pressure of between about 330 MPa and about 400 MPa. The shaped extrudate can then be press cured as above, or, alternatively, steam autoclaved at a temperature of between about 135° C. and about 160° C., for a period from about 30 minutes to 4 hours. The vulcanized extruded article can then be post cured in the same manner as a molded article.

Shaped articles of the present invention may also be prepared by laminating a curable polyepichlorohydrin gum stock to another elastomer (e.g., neoprene), for example by using a suitable primer or adhesive between the two elastomer layers.

This invention provides a curable polyepichlorohydrin gum stock with excellent resistance to scorch and good shelf life. These curable gum stocks can be vulcanized into elastomeric articles, such as gaskets, O-rings, hose, etc., having good physical properties, initially and after exposure to elevated temperatures, and having improved resistance to compression set when compared to conventionally cured polyepichlorohydrin gums.

The following examples are offered to aid understanding of the present invention and are not to be construed as limiting the scope thereof. Curing characteristics are reported under the heading "Rheometer". Data were obtained in accordance with ASTM D 2084-75 using a Monsanto Oscillating Disk Rheometer Model MP-V, with a 20 second preheat, a 100 cpm oscillator frequency, and a 3° arc.

Resistance to scorch is reported under the heading "Mooney Scorch". Data were obtained in accordance with ASTM D 1646-74 using a Scott Testing Inc. Mooney Viscometer Model ST1, with a 1 minute preheat and a small rotor at 121° C.

Physical properties of press cured and post cured samples are reported under the headings "Press cure" and "Post cure". Samples were in the form of 150×150×1.8 mm sheets and were pressed at about 5 MPa at the indicated conditions. After measurement of the indicated physical properties, portions of the samples were then post cured in an oven at the indicated conditions, and physical properties re-measured. Measurements were in accordance with ASTM D 412-75 using an Instron Tensile Tester, Method "A", using dumbell samples cut from 1.8 mm sheet with die "C".

Resistance to heat aging is reported under the heading "Accelerated aging of post cured sample". Data were obtained in accordance with ASTM D 412-75 (as above) and ASTM D 573-72.

Resistance to compression set is reported under the heading "Compression set, O-rings". Data were obtained in accordance with ASTM D 395-69 (reapproved 1975), Method B using type "1" O-rings with a 3.53 mm cross section, subjected to 25% compression at the indicated conditions.

EXAMPLE 1

Epichlorohydrin (CO) homopolymer was milled on a two-roll mill with a polyphenol, a tetraorganophosphonium salt, an acid acceptor, a filler, and two conventional heat stabilizers to form a curable gum stock. The ingredients were milled by putting the gum on the mill, adding the curing and cocuring agents as a group, adding all other ingredients as a group, and cutting the mixture back and forth until all ingredients were well dispersed. The curable gum stock was then molded and cured as indicated. The cure characteristics of the curable gum stock and the mechanical properties of the cured elastomer were determined before and after accelerated aging. Compression set data were also obtained. The composition of the curable gum stock and the above mentioned mechanical properties are set forth in Table I (as "Example 1") together for purposes of comparison with corresponding data on the same polymer gum using a conventional curing system (as "Comparison Run".) A low tendency to scorch, more rapid cure, superior aging properties and improved compression set values are shown for the novel composition of Example 1.

TABLE I

| Ingredient | Example 1 | Comparison Run |
|---|---|---|
| Polymer gum[a] (parts) | 100 | 100 |
| Bisphenol S (mmhr) | 6.25 | — |
| 2-Mercaptomidazoline[b] (mmhr) | — | 9.8 |
| $(n-C_4H_9)_3 (CH_2=CHCH_2)P^+Cl^-$ (mmhr) | 3.5 | — |
| $PbHPO_3$[c] (phr) | 12 | 5 |
| Lead phthalate[d] (phr) | — | 7 |
| ASTM N-550 Carbon black[e] (phr) | 30 | 30 |
| Nickel dibutyldithiocarbamate[f] (phr) | 1 | 1 |
| Nickel dimethyldithiocarbamate[g] (phr) | 1 | 1 |
| Rheometer, 160° C: | | |
| $M_L$ (N · m) | 0.40 | 0.40 |
| $M_H$ (N · m) | 8.9 | 6.1 |
| Min. to $M_H$ | 36 | 36 |
| $t_{sl}$ | 5.9 | 4.2 |
| $t_{c'}$ (90) | 26 | 29 |
| Rheometer, 177° C: | | |
| $M_L$ (N · m) | 0.40 | 0.34 |
| $M_H$ (N · m) | 9.8 | 7.3 |
| Min. to $M_H$ | 24 | 25 |
| $t_{sl}$ | 4.3 | 3.0 |
| $t_{c'}$ (90) | 13.5 | 17 |
| Mooney Scorch, 121° C.: | | |
| minimum viscosity | 10[h] | 11 |
| Minutes to 10 point rise | >25[h] | 22.5 |
| Point rise in 25 min. | 0[h] | 13 |
| Press cure, 15 min. 177° C.: | | |
| Tensile (MPa) | 15.16 | 15.16 |
| 100% Modulus (MPa) | 3.79 | 2.20 |
| Elongation at break (%) | 405 | 700 |

TABLE I-continued

| | | |
|---|---|---|
| Hardness (Shore A-2) | 69 | 61 |

Post cure, 16 hr., 149° C.:

| | | |
|---|---|---|
| Tensile (MPa) | 17.22 | 17.91 |
| 100% Modulus (MPa) | 4.82 | 5.34 |
| Elongation at break (%) | 300 | 260 |
| Hardness (Shore A-2) | 76 | 73 |

[a]"Hydrin 100", commercially available from B. F. Goodrich Chemical Co.
[b]"NA-22", commercially available from E. I. duPont de Nemours & Co.
[c]"Dyphos", commercially available from National Lead Co.
[d]"Dythal", commercially available from National Lead Co.
[e]"Philblack A", commercially available from Phillips Chemical Co.
[f]"Butyl Niclate", commercially available from R. T. Vanderbilt Co.
[g]"Methyl Niclate", commercially available from R. T. Vanderbilt Co.
[h]No change after 8 weeks storage at room temperature.

Accelerated aging of post cured sample - tensile (MPa):

| | 149° C. | | 163° C. | |
|---|---|---|---|---|
| Time | Example 1 | Comparison Run | Example 1 | Comparison Run |
| 1 day | 16.91 | 17.87 | 17.00 | 18.04 |
| 3 days | 16.81 | 16.78 | 13.72 | 15.73 |
| 1 week | 15.17 | 15.92 | 8.25 | 6.65 |
| 2 weeks | 9.12 | 8.83 | 3.33 | * |
| 3 weeks | 4.55 | 1.18 | 1.95 | * |
| 4 weeks | 3.62 | * | 1.09 | * |
| 5 weeks | 3.41 | * | 0.78 | * |
| 6 weeks | 2.52 | * | * | * |

Accelerated aging of post cured sample - 100% modulus (MPa):

| | 149° C. | | 163° C. | |
|---|---|---|---|---|
| Time | Example 1 | Comparison Run | Example 1 | Comparison Run |
| 1 day | 6.02 | 6.13 | 6.42 | 6.75 |
| 3 days | 6.78 | 6.80 | 6.50 | 5.97 |
| 1 week | 6.62 | 7.74 | 3.62 | 2.69 |
| 2 weeks | 3.79 | 3.51 | 1.87 | * |
| 3 weeks | 2.43 | 0.87 | 1.32 | * |
| 4 weeks | 2.00 | * | 0.83 | * |
| 5 weeks | 1.50 | * | * | * |
| 6 weeks | 1.10 | * | * | * |

Accelerated aging of post cured sample - elongation at break (%):

| | 149° C. | | 163° C. | |
|---|---|---|---|---|
| Time | Example 1 | Comparison Run | Example 1 | Comparison Run |
| 1 day | 267 | 233 | 240 | 220 |
| 3 days | 237 | 200 | 200 | 200 |
| 1 week | 200 | 183 | 250 | * |
| 2 weeks | 240 | 225 | 250 | * |
| 3 weeks | 250 | 200 | 255 | * |
| 4 weeks | 250 | * | 280 | * |
| 5 weeks | 250 | * | * | * |
| 6 weeks | 250 | * | * | * |

Accelerated aging of post cured sample - hardness (Shore A-2):

| | 149° C. | | 163° C. | |
|---|---|---|---|---|
| Time | Example 1 | Comparison Run | Example 1 | Comparison Run |
| 1 day | 76 | 76 | 79 | 78 |
| 3 days | 78 | 79 | 79 | 78 |
| 1 week | 80 | 79 | 72 | 64 |
| 2 weeks | 74 | 72 | 65 | 35 |
| 3 weeks | 70 | 55 | 60 | * |
| 4 weeks | 66 | * | 77 | * |
| 5 weeks | 70 | * | 55 | * |
| 6 weeks | 62 | * | * | * |

*too weak to test

Compression set, O-rings (%):

| | Example 1 | Comparison Run |
|---|---|---|
| 72 hrs. at 121° C. | | |
| Pressed cured, 15 min., 177° C. | 17 | 65 |
| Post cured, 24 hrs., 149° C. | 13 | 25 |
| 72 hrs. at 135° C. | | |
| Pressed cured, 15 min., 177° C. | 33 | 78 |
| Post cured, 24 hrs., 149° C. | 28 | 42 |
| 72 hrs. at 149° C. | | |
| Pressed cured, 15 min., 177° C. | 47 | 89 |
| Post cured, 24 hrs., 149° C. | 47 | 77 |

EXAMPLES 2 through 11

In a series of 10 runs polyepichlorohydrin gum (as used in Example 1) was compounded with polyphenol curing agent, various cocuring agents, an acid acceptor, a filler, and two conventional heat stabilizers. The resulting curable gum stock compositions were mixed, cured, and evaluated as in Example 1. Curing characteristics of the several compositions are set forth in Table II.

TABLE II

| | Example | | | | | | |
|---|---|---|---|---|---|---|---|
| Ingredient | 2 | 3 | 4 | 5 | 6 | 7 | 8 |
| Polymer gum (parts) | 100 | 100 | 100 | 100 | 100 | 100 | 100 |
| Bisphenol S (mmhr) | 6.25 | 6.25 | 6.25 | 6.25 | 6.25 | 6.25 | 6.25 |
| $(n\text{-}C_4H_9)_3(CH_2=CHCH_2)P^+Cl^-$ (mmhr) | 3.6 | | | | | | |
| $(C_6H_5)_3P^+(C_2H_5)I^-$ (mmhr) | | 3.6 | | | | | |
| $(n\text{-}C_4H_9)_4P^+Cl^-$ (mmhr) | | | 3.6 | | | | |
| $(C_6H_5)_3(C_6H_5CH_2)P^+Cl^-$ (mmhr) | | | | 3.6 | | | |
| $(C_6H_5)_3(C_6H_5COCH_2)P^+Br^-$ (mmhr) | | | | | 3.6 | | |
| $(n\text{-}C_4H_9)_4N^+OH^-$ (mmhr) | | | | | | 3.6 | |
| $(C_6H_5)(C_6H_5CH_2)(CH_3)S^+Br^-$ (mmhr) | | | | | | | 3.6 |
| $PbHPO_3$ (phr) | 12 | 12 | 12 | 12 | 12 | 12 | 12 |
| ASTM N-550 Carbon black (phr) | 30 | 30 | 30 | 30 | 30 | 30 | 30 |
| Nickel dibutyldithio-carbamate (phr) | 1 | 1 | 1 | 1 | 1 | 1 | 1 |
| Nickel dimethyldithio-carbamate (phr) | 1 | 1 | 1 | 1 | 1 | 1 | 1 |
| Rheometer, 177° C.: | | | | | | | |
| $M_L$ (N . m) | 0.23 | 0.34 | 0.34 | 0.34 | 0.23 | 0.45 | 0.0 |
| $M_H$ (N . m) | 9.83 | 9.83 | 9.83 | 10.28 | 6.55 | 9.72 | 5.10 |
| Min. to $M_H$ | 24 | 24 | 24 | 24 | 36 | 24 | 48 |
| $t_{sl}$ | 6 | 5 | 6.2 | 5.8 | 7.5 | 4.5 | 23 |
| $t_c'$ (90) | 13.3 | 10.2 | 12.7 | 14.0 | 30 | 13.5 | 43 |

| | Example | | |
|---|---|---|---|
| Ingredient | 9 | 10 | 11 |
| Polymer gum (parts) | 100 | 100 | 100 |
| Bisphenol S (mmhr) | 6.25 | 6.25 | 6.25 |

TABLE II-continued

| | | | |
|---|---|---|---|
| $(n-C_4H_9)_4N^+Br^-$ (mmhr) | 3.6 | | |
| $(CH_3C_6H_4)_3S^+Cl^-$ (mmhr) | | 3.6 | |
| $(C_6H_5)_4As^+Cl$ (mmhr) | | | 3.6 |
| $PbHPO_3$ (phr) | 12 | 12 | 12 |
| ASTM N-550 Carbon black (phr) | 30 | 30 | 30 |
| Nickel dibutyldithio-carbamate (phr) | 1 | 1 | 1 |
| Nickel dimethyldithio-carbamate (phr) | 1 | 1 | 1 |
| Rheometer, 177° C.: | | | |
| $M_L$ (N . m) | 0.23 | 0.11 | 0.11 |
| $M_H$ (N . m) | 8.70 | 8.48 | 9.60 |
| Min. to $M_H$ | 24 | 24 | 24 |
| $t_{sl}$ | 6.0 | 5.4 | 4.5 |
| $t_c'$ (90) | 11.5 | 20.0 | 10.2 |
| Mooney Scorch, 121° C.: | | | |
| Minimum viscosity | 2 | 2 | — |
| Minutes to 10 point rise | >25 | >25 | — |
| Point rise in 25 min. | 0 | 0 | — |
| Compression set, O-rings (%): 72 hrs at 121° C. | | | |
| Press cured, 11.5 min, 177° C. | 24.1 | | |
| Press cured, 20 min, 177° C. | | 25.7 | — |
| Post cured, 24 hrs, 149° C. | 22.2 | 20.4 | — |

EXAMPLES 12 through 16

In a series of 5 runs polyepichlorohydrin gum (as used in Example 1) was compounded with various polyphenol curing agents, a tetraorganophosphonium cocuring agent, an acid acceptor, and a filler. The resulting curable gum stock compositions were mixed, cured, and evaluated as in Example 1.

Curing characteristics of each formulation are set forth in Table III. All polyphenols were effective and gave good cures, although cure rates varied.

TABLE III

| | Example | | | | |
|---|---|---|---|---|---|
| Ingredient | 12 | 13 | 14 | 15 | 16 |
| Polymer gum (parts) | 100 | 100 | 100 | 100 | 100 |
| Hydroquinone (mmhr) | 6.25 | | | | |
| Bisphenol A (mmhr) | | 6.25 | | | |
| 4,4'-$HOC_6H_4COC_6H_4OH$ (mmhr) | | | 6.25 | | |
| Bisphenol S (mmhr) | | | | 6.25 | |
| Bisphenol AF (mmhr) | | | | | 6.25 |
| $(n-C_4H_9)_3(CH_2=CHCH_2)P^+Cl^-$ (mmhr) | 3.6 | 3.6 | 3.6 | 3.6 | 3.6 |
| $PbHPO_3$ (phr) | 12 | 12 | 12 | 12 | 12 |
| ASTM N-550 Carbon black (phr) | 30 | 30 | 30 | 30 | 30 |
| Rheometer, 177° C.: | | | | | |
| $M_L$ (N . m) | 0.45 | 0.23 | 0.23 | 0.23 | 0.23 |
| $M_H$ (N . m) | 4.52 | 5.31 | 9.83 | 9.83 | 9.23 |
| Min to $M_H$ | 24 | 24 | 24 | 24 | 24 |
| $t_{sl}$ | 6.2 | 6.0 | 4.7 | 6.0 | 5.5 |
| $t_c'$ (90) | 16.5 | 18.5 | 9.5 | 13.3 | 12.5 |

EXAMPLE 17

Epichlorohydrin-ethylene oxide (ECO) copolymer was compounded with a polyphenol, a tetraorganophosphonium salt, an acid acceptor, a filler, a heat stabilizer, and a processing aid. The gum stock was mixed, cured, and evaluated as in Example 1. The composition of the curable gum stock and the indicated mechanical properties are set forth in Table IV (as "Example 17") together for purposes of comparison with corresponding data on the same polymer gum using a conventional curing system (as "Comparison Run").

Superior retention of properties was obtained for the elastomeric rubber employing the cure system of the present invention (Example 17).

TABLE IV

| | Example 17 | Comparison Run |
|---|---|---|
| Ingredient | | |
| Polymer gum[a] (parts) | 100 | 100 |
| Bisphenol S (mmhr) | 6.25 | — |
| $(C_6H_5)_3(C_6H_5CH_2)P^+Cl^-$ (mmhr) | 3.6 | — |
| 2-Mercaptoimidazoline (mmhr) | — | 9.8 |
| $PbHPO_3$ (phr) | 12 | 12 |
| ASTM N-550 Carbon black (phr) | 50 | 50 |
| Polymerized 2,2,4-trimethyl-1,2-dihydroquinoline[b] (phr) | 2.5 | 2.5 |
| Polymer processing additive[c] (phr) | 1 | 1 |
| Press cure, 20 min. 188° C.: | | |
| Tensile (MPa) | 12.00 | 12.69 |
| 100% Modulus (MPa) | 4.09 | 4.49 |
| Elongation at break (%) | 343 | 353 |
| Hardness (Shore A-2) | 73 | 75 |
| Post cure, 24 hrs., 149° C.: | | |
| Tensile (MPa) | 13.05 | 14.65 |
| 100% Modulus (MPa) | 6.10 | 6.76 |
| Elongation at break (%) | 217 | 207 |
| Hardness (Shore A-2) | 82 | 78 |
| Accelerated aging of post cured sample - tensile (MPa): Time at 149° C. | | |
| 1 week | 10.44 | 9.42 |
| 3 weeks | 7.88 | 3.28 |
| 5 weeks | 6.86 | 1.71 |
| Accelerated aging of post cured sample - 100% modulus (MPa): Time at 149° C. | | |
| 1 week | 6.04 | 8.16 |
| 3 weeks | 6.25 | — |
| 5 weeks | 6.15 | — |
| Accelerated aging of post cured sample - elongation at break (%): Time at 149° C. | | |
| 1 week | 170 | 130 |
| 3 weeks | 150 | 70 |
| 5 weeks | 120 | 30 |
| Accelerated aging of post cured samle - hardness (Shore A-2): Time at 149° C. | | |
| 1 week | 84 | 85 |
| 3 weeks | 87 | 84 |
| 5 weeks | 87 | 77 |

[a] "Hydrin 200", commercially available from B. F. Goodrich Chemical Co.
[b] "Agerite Resin D", commercially available from R. T. Vanderbilt Co.
[c] $C_8F_{17}SO_2N(CH_3)CH_2CH_2OH/CaCO_3$, 3/1 by wt.

EXAMPLES 18 through 20

In a series of three runs, epichlorohydrin homopolymer was compounded with a polyphenol, a tetraorganoammonium salt, an acid acceptor, a filler and optionally with one of two heat stabilizers. The resulting gum stock compositions were mixed, cured, and evaluated as in Example 1. The composition of the curable gum stocks and their indicated mechanical properties are set forth in Table V.

The heat stabilizers, polymerized 2,2,4-trimethyl-1,2-dihydroquinoline and N,N'-di-beta-naphthyl-p-phenylenediamine, were useful in prolonging elastomeric properties.

TABLE V

| Ingredient | Example 18 | Example 19 | Example 20 |
|---|---|---|---|
| Polymer gum (parts) | 100 | 100 | 100 |
| Hydroquinone (mmhr) | 9 | 9 | 9 |
| $(n\text{-}C_4H_9)_4N^+OH^{-a}$ (mmhr) | 1.5 | 1.5 | 1.5 |
| $PbHPO_3$ (phr) | 18 | 18 | 18 |
| ASTM N-990 Carbon black [b] (phr) | 30 | 30 | 30 |
| Polymerized 2,2,4-trimethyl-1-2-dihydroquinoline (phr) | | 2.5 | |
| N,N'-di-beta-naphthyl-p-phenylenediamine[c] (phr) | | | 5.9 |

[a] In 25% $CH_3OH$ solution.
[b] "Thermax MT", commercially available from Thermatomic Carbon Co.
[c] "Agerite White", commercially available from R. T. Vanderbilt Co.

Properties after press cure (10 min. at 177° C.) and post cure (24 hrs. at 177° C.):

| | | | |
|---|---|---|---|
| Tensile (MPa) | 8.06 | 7.44 | 5.65 |
| Elongation at break (%) | 280 | 200 | 230 |
| Hardness (Shore A-2) | 62 | 78 | 64 |

Accelerated aging of post cured sample, 177° C. - Tensile (MPa):

| Time | | | |
|---|---|---|---|
| 3 days | 0.55 | 4.24 | 5.37 |
| 7 days | *2.55 | 2.17 | |
| 14 days | * | 3.72 | 2.07 |

Accelerated aging of post cured sample, 177° C. - Elongation at break (%):

| Time | | | |
|---|---|---|---|
| 3 days | 300 | 110 | 190 |
| 7 days | * | 100 | 130 |
| 14 days | * | 105 | 100 |

Accelerated aging of post cured sample, 177° C. - Hardness (Shore A-2):

| Time | | | |
|---|---|---|---|
| 3 days | 52 | 70 | 68 |
| 7 days | 54 | 75 | 66 |
| 14 days | * | 77 | 67 |

* too weak to test

EXAMPLES 21 through 24

In a series of 4 runs, epichlorohydrin homopolymer was compounded with a polyphenol, a tetraorganophosphonium salt, two different acid acceptors (at two different concentrations), a filler, and two conventional heat stabilizers. The curable gum stocks were mixed, cured and evaluated as in Example 1. The composition of each gum stock and the indicated mechanical properties are set forth in Table VI.

The acid acceptor white lead was more effective than the acid acceptor red lead. Higher levels gave more rapid cures.

TABLE VI

| Ingredient | Example 21 | Example 22 | Example 23 | Example 24 |
|---|---|---|---|---|
| Polymer gum (parts) | 100 | 100 | 100 | 100 |
| Bisphenol S (mmhr) | 6.25 | 6.25 | 6.25 | 6.25 |
| $(C_6H_5)_3(C_6H_5CH_2)P^+Cl^-$ (mmhr) | 3.6 | 3.6 | 3.6 | 3.6 |
| PbO (phr) | 5 | 10 | — | — |
| $Pb_3O_4$ (phr) | — | — | 5 | 10 |
| ASTM N-550 Carbon Black (phr) | 40 | 40 | 40 | 40 |
| Nickel dibutyldithiocarbamate (phr) | 1 | 1 | 1 | 1 |
| Nickel dimethyldithiocarbamate (phr) | 1 | 1 | 1 | 1 |
| Rheometer, 177° C.: | | | | |
| $M_L$ (N.m) | .11 | .23 | .23 | .11 |
| $M_H$ (N.m) | 10.85 | 11.07 | 8.81 | 11.3 |
| Min to $M_H$ | 36 | 24 | 36 | 31 |
| $t_{sl}$ | 5.0 | 4.5 | 8.7 | 7.3 |
| $t_c'$ (90) | 22.2 | 13.8 | 30.5 | 26.7 |

Various modifications and alterations of this invention will be apparent to those skilled in the art without departing from the scope and spirit of this invention and the latter should not be restricted to that set forth herein for illustrative purposes.

What is claimed is:

1. A polyepichlorohydrin gum stock composition, comprising:
   (a) polyepichlorohydrin gum;
   (b) polyphenol curing agent;
   (c) organo-onium cocuring agent selected from compounds of the formulas $$(R^1)_4Q^{+1}(X^{-m})_{1/m}$$

$$(R^1)_3QR^2Q(R^1)_3{}^{+2}(X^{-m})_{2/m}$$

wherein Q is a nitrogen, arsenic or phosphorus atom; X is an anion of valence m; each $R^1$ is a monovalent organic radical containing 1 to 20 carbon atoms, is the same as or different from any other $R^1$, and can combine with another $R^1$ to form a cyclic structure containing a Q atom; and $R^2$ is a divalent organic radical containing 2 to 12 carbon atoms;

$$(R^3)_3S^{+1}(X^{-m})_{1/m}$$

or $$(R^3)_2SR^4S(R^3)_2{}^{+2}(X^{-m})_{2/m}$$

wherein S is sulfur; X is an anion of valence m; each $R^3$ is a monovalent organic radical containing 1 to 20 carbon atoms, is the same as or different from any other $R^3$, and can combine with another $R^3$ to form a cyclic structure containing an S atom; $R^4$ is a divalent organic radical containing 2 to 12 carbon atoms; and at least one $R^3$ or $R^4$ group is aromatic;
   which composition in reactive association with an acid acceptor will, upon exposure to heat, cure into an elastomer.

2. A composition according to claim 1, wherein said curing agent is selected from the class consisting of:
   (i) polyhydroxy benzenes, naphthalenes, anthracenes, chromones, xanthones, and anthraquinones; and
   (ii) polyphenols of the formula

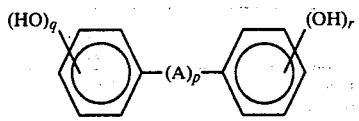

wherein p is 0 or 1; the sum (q+r) is 2 or more; and A is a thio, oxy, sulfinyl, sulfonyl or carbonyl radical or a divalent organic radical containing 1 to 13 carbon atoms.

3. A composition according to claim 1, further comprising a heat stabilizer.

4. A composition according to claim 1, wherein said curing agent is Bisphenol S.

5. A composition according to claim 1, wherein said cocuring agent is a tetraorganophosphonium salt.

6. A composition according to claim 1, wherein said composition contains, per 100 grams of said polyepichlorohydrin gum, from about 0.3 to 15 millimoles of said curing agent, and from about 0.2 to 7.5 millimoles of said cocuring agent.

7. A composition according to claim 6, wherein said composition contains, per 100 parts by weight of said polyepichlorohydrin gum, from about 0.1 to 20 parts by weight of a heat stabilizer.

8. A composition according to claim 6, wherein said curing agent is Bisphenol S, and said cocuring agent is a tetraorganophosphonium salt.

9. A curable polyepichlorohydrin gum stock composition comprising:
  (a) polyepichlorohydrin gum;
  (b) polyphenol curing agent;
  (c) organo-onium cocuring agent selected from compounds of the formulas

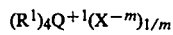

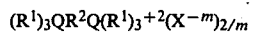

wherein Q is a nitrogen, arsenic or phosphorus atom; X is an anion of valence m; each $R^1$ is a monovalent organic radical containing 1 to 20 carbon atoms, is the same as or different from any other $R^1$, and can combine with another $R^1$ to form a cyclic structure containing a Q atom; and $R^2$ is a divalent organic radical containing 2 to 12 carbon atoms;

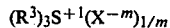

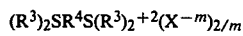

wherein S is sulfur; X is an anion of valence m; each $R^3$ is a monovalent organic radical containing 1 to 20 carbon atoms, is the same as or different from any other $R^3$, and can combine with another $R^3$ to form a cyclic structure containing an S atom; $R^4$ is a divalent organic radical containing 2 to 12 carbon atoms; and at least one $R^3$ or $R^4$ group is aromatic; and
  (d) an acid acceptor.

10. A composition according to claim 9, wherein said curing agent is selected from the class consisting of
  (a) polyhydroxy benzenes, naphthalenes, anthracenes, chromones, xanthones, and anthraquinones; and
  (b) polyphenols of the formula

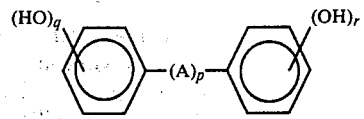

wherein p is 0 or 1; the sum (q+r) is 2 or more; and A is a thio, oxy, sulfinyl, sulfonyl, or carbonyl radical or a divalent organic radical containing 1 to 13 carbon atoms.

11. A composition according to claim 9, further comprising a heat stabilizer.

12. A composition according to claim 9, wherein said curing agent is Bisphenol S.

13. A composition according to claim 9, wherein said cocuring agent is a tetraorganophosphonium salt.

14. A composition according to claim 9, wherein said acid acceptor is an inorganic base.

15. A composition according to claim 9, wherein said acid acceptor is dibasic lead phosphite or white lead.

16. A composition according to claim 9, wherein said composition contains, per 100 grams of said polyepichlorohydrin gum, from about 0.3 to 15 millimoles of said curing agent, from about 0.2 to 7.5 millimoles of said cocuring agent, and from about 0.5 to 40 grams of said acid acceptor.

17. A composition according to claim 16, wherein said curing agent is Bisphenol S, said cocuring agent is a tetraorganophoshonium salt, and said acid acceptor is an inorganic base.

18. A composition comprising:
  (a) polyepichlorohydrin gum;
  (b) polyphenol curing agent; and
  (c) organo-onium cocuring agent selected from compounds of the formulas

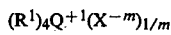

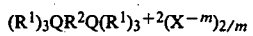

wherein Q is a nitrogen, arsenic or phosphorus atom; X is an anion of valence m; each $R^1$ is a monovalent organic radical containing 1 to 20 carbon atoms, is the same as or different from any other $R^1$, and can combine with another $R^1$ to form a cyclic structure containing a Q atom; and $R^2$ is a divalent organic radical containing 2 to 12 carbon atoms;

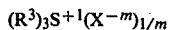

or

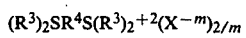

wherein S is sulfur; X is an anion of valence m; each $R^3$ is a monovalent organic radical containing 1 to 20 carbon atoms, is the same as or different from any other $R^3$, and can combine with another $R^3$ to form a cyclic structure containing an S atom; $R^4$ is a divalent organic radical containing 2 to 12 carbon atoms; and at least one $R^3$ or $R^4$ group is aromatic;
said composition containing, per 100 parts of said polyepichlorohydrin gum, from about 100 to 900 parts of said curing agent, and from about 100 to 900 parts of said cocuring agent.

19. A masterbatch useful in making curable polyepichlorohydrin gumstock, said masterbatch comprising a combination of 100 parts by weight of a polyepichlorohydrin gum as the carrier of said masterbatch and 100–900 parts by weight of a polyphenol as a curing agent for said polyepichlorohydrin gumstock.

20. A composition comprising:
(a) polyepichlorohydrin gum; and
(b) organo-onium cocuring agent selected from compounds of the formulas $$(R^1)_4Q^{+1}(S^{-m})_{1/m}$$

$$(R^1)_3QR^2Q(R^1)_3{}^{+2}(X^{-m})_{2/m}$$

wherein Q is a nitrogen, arsenic or phosphorus atom; X is an anion of valence m; each $R^1$ is a monovalent organic radical containing 1 to 20 carbon atoms, is the same as or different from any other $R^1$, and can combine with another $R^1$ to form a cyclic structure containing a Q atom; and $R^2$ is a divalent organic radical containing 2 to 12 carbon atoms;

$$(R^3)_3S^{+1}(X^{-m})_{1/m}$$

or $$(R^3)_2SR^4S(R^3)_2{}^{+2}(X^{-m})_{2/m}$$

wherein S is sulfur; X is an anion of valence m; each $R^3$ is a monovalent organic radical containing 1 to 20 carbon atoms, is the same as or different from any other $R^3$, and can combine with another $R^3$ to form a cyclic structure containing an S atom; $R^4$ is a divalent organic radical containing 2 to 12 carbon atoms; and at least one $R^3$ or $R^4$ group is aromatic;
said composition containing 100 to 900 parts of said cocuring agent per 100 parts of said gum.

21. A method for curing a polyepichlorohydrin gum, comprising the steps of:
(a) admixing therewith, per one hundred grams of said polyepichlorohydrin gum, from about 0.3 to 15 millimoles of polyphenol curing agent; from about 0.2 to 7.5 millimoles of organo-onium cocuring agent selected from compounds of the formulas $$(R^1)_4Q^{+1}(X^{-m})_{1/m}$$

$$(R^1)_3QR^2Q(R^1)_3{}^{+2}(X^{-m})_{2/m}$$

wherein Q is a nitrogen, arsenic or phosphorus atom; X is an anion of valence m; each $R^1$ is a monovalent organic radical containing 1 to 20 carbon atoms, is the same as or different from any other $R^1$, and can combine with another $R^1$ to form a cyclic structure containing a Q atom; and $R^2$ is a divalent organic radical containing 2 to 12 carbon atoms;

$$(R^3)_3S^{+1}(X^{-m})_{1/m}$$

or $$(R^3)_2SR^4S(R^3)_2{}^{+2}(X^{-m})_{2/m}$$

wherein S is sulfur; X is an anion of valence m; each $R^3$ is a monovalent organic radical containing 1 to 20 carbon atoms, is the same as or different from any other $R^3$, and can combine with another $R^3$ to form a cyclic structure containing an S atom; $R^4$ is a divalent organic radical containing 2 to 12 carbon atoms; and at least one $R^3$ or $R^4$ group is aromatic;
and from about 0.5 to 40 grams of an acid acceptor;
(b) shaping said admixture by molding or extruding; and
(c) subjecting said shaped admixture to sufficient heat and pressure to form a vulcanized shaped article.

22. A method according to claim 21, wherein said admixing step further comprises the addition of from about 0.1 to 20 parts by weight of a heat stabilizer per one hundred parts by weight of said polyepichlorohydrin gum.

23. A method according to claim 21, wherein said curing agent is Bisphenol S, said cocuring agent is a tetraorganophosphonium salt, and said acid acceptor is an inorganic base.

24. A shaped article made according to claim 21.
25. A shaped article made according to claim 22.
26. A shaped article made according to claim 23.

* * * * *

UNITED STATES PATENT AND TRADEMARK OFFICE
CERTIFICATE OF CORRECTION

PATENT NO. : 4,287,322

DATED : September 1, 1981

INVENTOR(S) : Allan T. Worm

It is certified that error appears in the above—identified patent and that said Letters Patent is hereby corrected as shown below:

Col. 4, l. 60: "tritolylsulfonium," should read
-- tritolylsulfonium nitrate, --.

Col. 5, l. 31: "phenyl-betanaphthylamine" should read
-- phenyl-beta-naphthylamine --.

Col. 10, l. 2: the asterisk should be read as -- 287 --.

Col. 13, l. 39: "*2.55  2.17" should read
-- *    2.55    2.17 -- under Examples 18, 19, and 20, respectively.

Col. 16, l. 30: "tetraorganophoshonium" should read
-- tetraorganophosphonium --.

Signed and Sealed this

First Day of December 1981

[SEAL]

Attest:

GERALD J. MOSSINGHOFF

Attesting Officer  Commissioner of Patents and Trademarks